United States Patent
Ooishi

Patent Number: 5,692,824
Date of Patent: Dec. 2, 1997

[54] VEHICULAR CLEARANCE LAMP HAVING IMPROVED LATERAL ILLUMINATION

[75] Inventor: Kazutami Ooishi, Shizuoka, Japan

[73] Assignee: Koito Manufacturing Co., Ltd., Tokyo, Japan

[21] Appl. No.: 543,894

[22] Filed: Oct. 17, 1995

[30] Foreign Application Priority Data

Oct. 17, 1994 [JP] Japan .................. HEI.6-250681

[51] Int. Cl.$^6$ .......................................... B60Q 1/32
[52] U.S. Cl. .................. 362/80; 362/297; 362/293; 362/240
[58] Field of Search .................... 362/61, 80, 297, 362/346, 293, 240, 245

[56] References Cited

U.S. PATENT DOCUMENTS

| | | | |
|---|---|---|---|
| 4,903,173 | 2/1990 | Mochizuki et al. | 362/240 |
| 4,916,585 | 4/1990 | Nino | 362/346 |
| 4,994,947 | 2/1991 | Fesko | 362/297 |
| 5,081,564 | 1/1992 | Mizoguchi et al. | 362/61 |
| 5,172,972 | 12/1992 | Terao | 362/66 |
| 5,287,101 | 2/1994 | Serizawa | 340/815.76 |
| 5,353,204 | 10/1994 | Kawamura | 362/240 |
| 5,556,194 | 9/1996 | Natsume et al. | 362/246 |

FOREIGN PATENT DOCUMENTS

| | | | |
|---|---|---|---|
| 5-166402 | 7/1993 | Japan | 362/240 |

Primary Examiner—Ira S. Lazarus
Assistant Examiner—Sara Sachie Raab
Attorney, Agent, or Firm—Sughrue,Mion,Zinn,Macpeak & Seas, PLLC

[57] ABSTRACT

A vehicular lamp in which a lamp body is mounted at a corner of the vehicle body, the lamp body has a front opening which opens toward from the front or rear of the vehicle body to the side thereof. A front lens, which curves from the front or rear of the vehicle body to the side thereof, covers the front opening of the lamp body. A region of the lamp body surrounding a bulb insertion hole protrudes frontward. A light bulb engaged with the bulb insertion hole is disposed frontward of the periphery of the front opening of the lamp body.

23 Claims, 5 Drawing Sheets

VEHICULAR CLEARANCE LAMP HAVING IMPROVED LATERAL ILLUMINATION

BACKGROUND OF THE INVENTION

The present invention relates to a vehicular lamp, such as a clearance lamp, which is adapted to be mounted at a corner portion of a vehicle body and which produces a light beam directed from the front or rear towards the side of the vehicle.

FIG. 1 shows a conventional clearance lamp integrally formed with a turn-signal lamp mounted on a vehicle body and which is of the same general type as that which the invention pertains. Such a conventional lamp is disclosed in Unexamined Japanese Patent Application (OPI) No. Hei. 1-176601.

In the conventional clearance lamp shown in FIG. 1, a lamp body 1 includes a front opening part which opens from the front (downward in FIG. 1) to the side (leftward in FIG. 1) of a vehicle body B. A clear, curved front lens 2 is provided with a frontward-inclined illumination part 3a and a rearward-inclined illumination part 3b. The front lens 2 is mounted on the front opening part of the lamp body 1 to define a clearance lamp chamber Sa inward (rightward in FIG. 1) in the widthwise direction of the vehicle body B and a turn-signal lamp chamber Sb outward in the widthwise direction of the vehicle body B.

Light bulbs 6 and 7 are engaged with bulb insertion holes 4 and 5, respectively, formed in the lamp body 1. Thus, the conventional lamp shown in FIG. 1 is integrally constituted by a clearance lamp and a turn-signal lamp.

An amber-colored inner lens 8 is disposed in the turn-signal lamp chamber Sb extending along the inner surface of the front lens 2. The inner lens 8 has an frontward-inclined lens surface 8a and an rearward-inclined lens surface 8b which extend parallel to the frontward-inclined illumination part 3a and the rearward-inclined illumination part 3b, respectively, of the front lens 2 so that light emitted from the light bulb 7 is directed both in the frontward-inclined direction indicated by $L_1$ and in the rearward-inclined direction indicated by $L_2$.

According to the conventional vehicular lamp as described above, however, since the bulb insertion hole 4 (or 5) is generally formed at the top of a rearward-expanding portion of the lamp body 1, the lamp body is required to have a certain length in the depth direction. Further, the rear end of the bulb 6 (or 7) engaging the bulb insertion hole 4 (or 5) protrudes rearward of the lamp body 1 to a significant extent, thereby making the effective size of the lamp in the depth direction quite large. Accordingly, a correspondingly large space is required within the vehicle body for accommodating the lamp. In other words, in order to provide light beams in sideward- and rearward-inclined directions of the vehicle sufficient to improve visibility in those directions, it is preferable that the vehicular lamp have a shape such that it curves to the side of the vehicle with the bulb located in the vicinity of the most-curved edge of the lamp. However, such a shape undesirably causes the lamp to have a large dimension in the depth direction because of the rearward expanding part of the lamp body 1 and the rear end of the bulb 7 which protrudes rearward.

SUMMARY OF THE INVENTION

The present invention was made in view of the foregoing drawbacks accompanying the conventional vehicular lamp. Accordingly, an object of the present invention is to provide a vehicular lamp mounted at a corner portion of the vehicle body and which is capable of enlarging the light illumination region at the side and rearward-inclined areas of the vehicle body without increasing the dimension of the vehicle lamp in the depth direction.

The above and other objects can be achieved by the provision of a vehicular lamp in which, according to the invention, a lamp body is mounted at a corner portion of the vehicle body, the lamp body having a front opening which opens from the front or rear of the vehicle body to the side thereof. A front lens, which curves from the front or rear of the vehicle body to the side thereof, is mounted over the front opening of the lamp body. A region of the lamp body surrounding a bulb insertion hole protrudes frontward, and a light bulb engages the bulb insertion hole so that the bulb is positioned forward of the periphery of the front opening of the lamp body.

According to a second aspect of the invention, an inner lens having a functional color (amber, red, etc.) is provided inside a clear front lens formed integrally with an frontward-inclined illumination part and a rearward-inclined illumination part. The inner lens is integrally provided with a frontward-inclined lens surface and a rearward-inclined lens surface which are substantially parallel to the frontward-inclined illumination part and the rearward-inclined illumination part, respectively, of the front lens. The vehicular lamp of the second aspect of the invention is also provided with a turn-signal lamp formed integrally with a stair-shaped reflector disposed on an inner surface of the inner side in the widthwise direction of the lamp body for reflecting light emitted from the light bulb to illuminate the front region of the vehicle.

According to a third aspect of the invention, the lamp body and front lens of the turn-signal lamp are formed integrally with a lamp body and front lens, respectively, for constituting another lamp disposed adjacent the turn-signal lamp, so that the turn-signal lamp is formed integrally with the different lamp.

According to a fourth aspect of the invention, the turn-signal lamp takes the form of a side turn-signal lamp provided outside the vehicle body adjacent a front turn-signal lamp having a stair-shaped reflector, wherein the lamp body and front lens of the side turn-signal are integrally formed with the lamp body and front lens, respectively, of the front turn-signal lamp.

According to the present invention, since the light bulb is positioned forward of the periphery of the front opening of the lamp body, the region of illumination at the side of the lamp, that is, the illumination region at the side of the vehicle, is enlarged compared with the conventional lamp in which the bulb is located rearward of the peripheral plane of the front opening of the lamp body.

Further, since the region surrounding the bulb insertion hole protrudes frontward from the periphery of the front opening of the lamp body, the rear wall of the lamp body protrudes only slightly in the rearward direction of the lamp body, and therefore the rear end of the light bulb engaged with the bulb insertion hole protrudes also only slightly in the rearward direction of the lamp body.

In the turn-signal lamp according to the second aspect of the invention, a part of the light emitted from the light bulb is reflected by the reflector to illuminate the region to the front of the lamp, another part of the light illuminates the frontward-inclined region of the vehicle upon passing through the frontward-inclined lens surface of the inner lens, and still another part of the light illuminates the rearward-inclined region of the vehicle upon passing through the rearward-inclined lens surface of the inner lens. The stair-shaped reflector formed on the inner surface of the lamp body has the effect of allowing the dimension in the depth direction of the lamp body to be reduced.

Owing to the third aspect of the invention, since the turn-signal lamp is formed integrally with the other lamp, a compact vehicular lamp can be realized.

On the other hand, in accordance with the fourth aspect of the present invention, light from the reflector of the side turn-signal lamp is utilized for illuminating the frontward area of the vehicle body, in addition to light from the reflector of the front turn-signal lamp. The stair-shaped reflector of the front turn-signal lamp allows the dimension in the depth direction of the front turn-signal lamp to be reduced.

DESCRIPTION OF THE PREFERRED EMBODIMENTS

Preferred embodiments of the present invention will now be described in detail with reference to the accompanying drawings.

Figure 2:
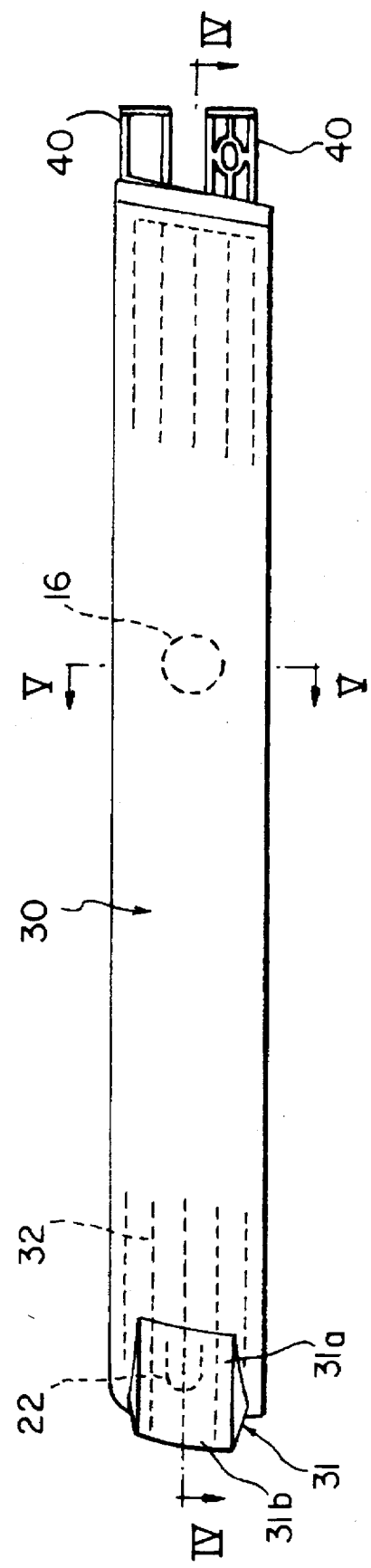
FIG. 2 is a front view of a turn-signal lamp according to one embodiment of the present invention having integrally formed front- and side turn-signal lamps.
Figure 3:
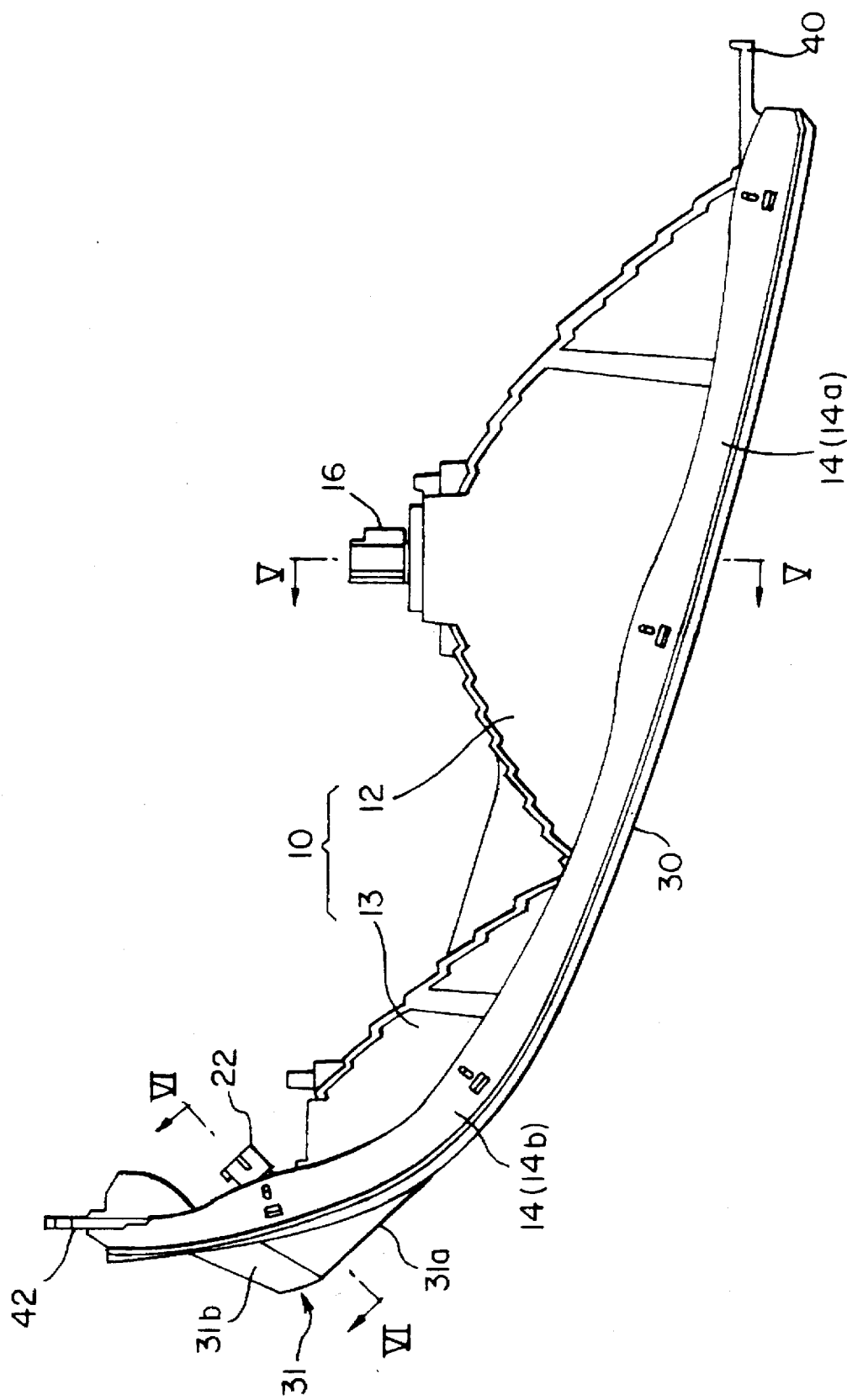
FIG. 3 is a plan view of the lamp shown in FIG. 2.
Figure 4:
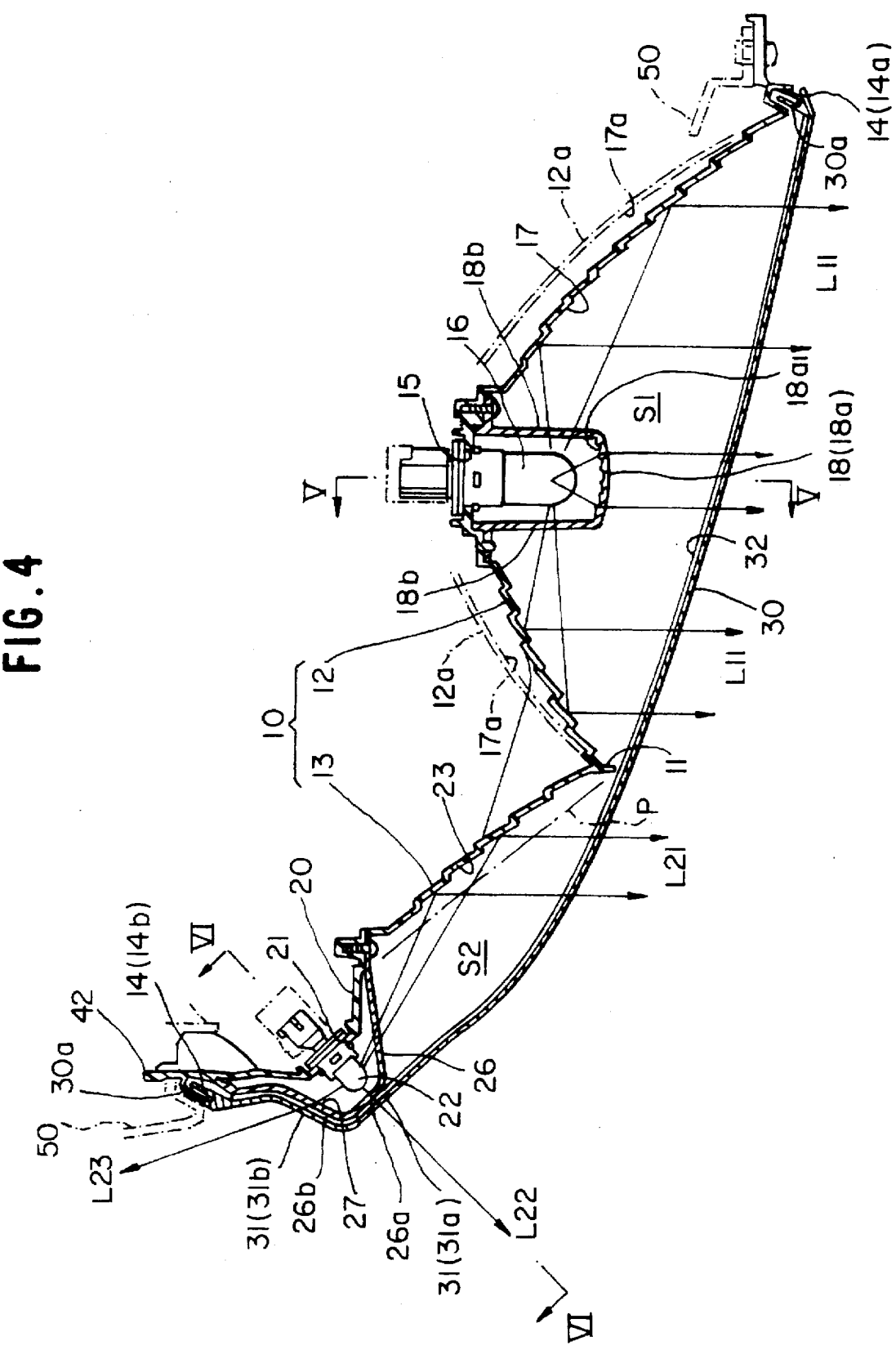
FIG. 4 is a horizontal sectional view of the lamp of FIG. 2 cut along a line IV—IV in FIG. 2.
Figure 5:
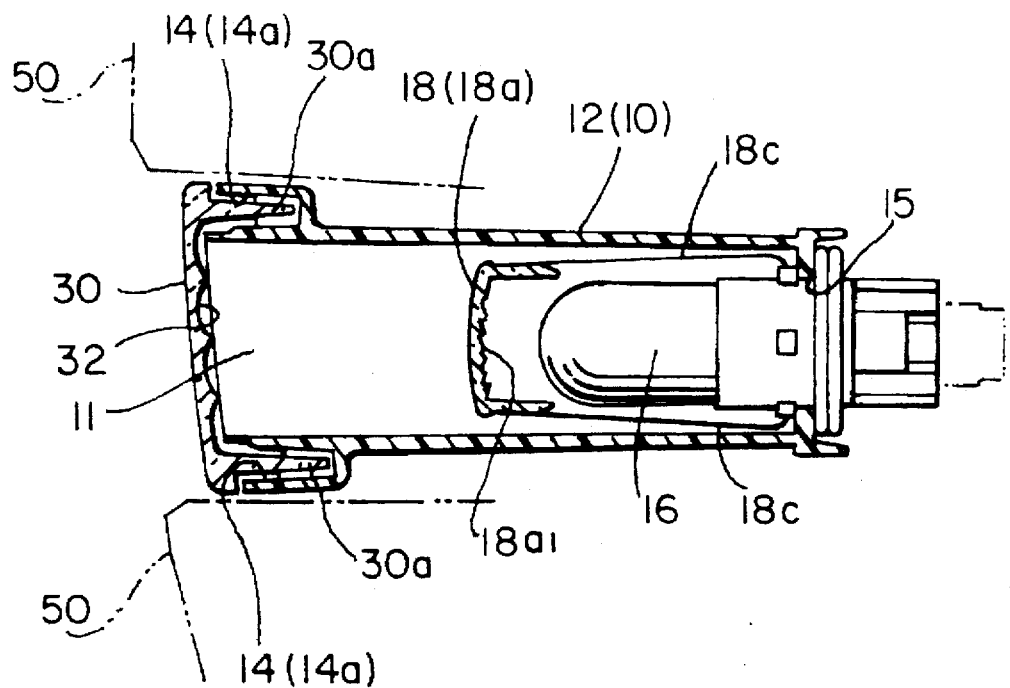
FIG. 5 is a vertical sectional view of the lamp cut along a line V—V in FIGS. 2 and 3.
Figure 6:
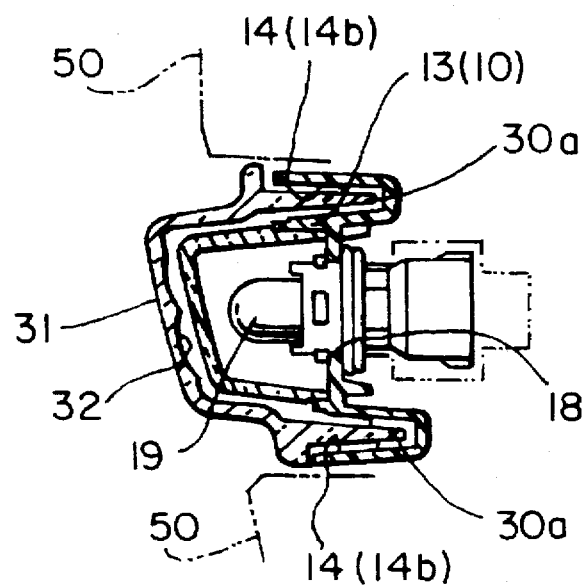
FIG. 6 is a vertical sectional view of the lamp cut along a line VI—VI in FIGS. 3 and 4.

FIGS. 2 through 6 show a turn-signal lamp constructed according to a preferred embodiment of the present invention. Specifically, FIG. 2 is a front view of a turn-signal lamp having a front turn-signal lamp and a side turn-signal lamp formed integrally with one another, FIG. 3 is a plan view of the lamp shown in FIG. 2, FIG. 4 is a horizontal sectional view of the lamp cut along a line IV—IV in FIG. 2, FIG. 5 is a vertical sectional view of the lamp cut along a line V—V in FIGS. 2 and 3, and FIG. 6 is a vertical sectional view of the lamp cut along a line VI—VI in FIGS. 3 and 4.

A lamp body 10, which is laterally elongated compared with the vertical height thereof, is mounted at the front-right corner of a vehicle body. The lamp body 10 has a rectangular opening extending from the front (downward direction in FIGS. 2 and 3) of the vehicle body to the side thereof (leftward in FIGS. 2 and 3). A shade 11 is disposed substantially at the center position in the lateral direction of the lamp body 10, extending vertically therefrom. The lamp is constituted by integrally forming a vessel-shaped lamp body 12 for a front turn-signal lamp mounted at an inner side in the widthwise direction of the vehicle body (rightward in FIGS. 2 and 3) and a vessel-shaped lamp body 13 for a side turn-signal lamp mounted at an outer side in the widthwise direction of the vehicle body.

A clear front lens 30 is engaged with a seal groove 14 (14a, 14b) formed at a front opening of the lamp body 10 (12, 13) so as to define a lamp chamber $S_1$ for a front turn-signal lamp and a lamp chamber $S_2$ for a side turn-signal lamp. The front lens 30 curves from the front to the side of the vehicle body. A bracket 40 protrudes from the lamp body 10 at an inner edge portion in the widthwise direction thereof for securing the lamp to a bumper 50 of the vehicle body. Also, a hook 42 projects from the lamp body 10 at an outer edge portion in the widthwise direction thereof for attached the lamp to the bumper 50, that is, the vehicle body.

A bulb insertion hole 15 is formed in the rear top portion of the lamp body 12, and a light bulb 16, acting as a light source, is engaged in the bulb insertion hole 15. A paraboloidal reflector 17 is formed integrally on the inner surface of the lamp body 12 for reflecting light emitted from the bulb 16 to the front of the vehicle. An amber-colored cap member 18 is mounted on the peripheral edge of the bulb insertion hole 15. Light from the bulb 16 is colored amber upon passing through the cap member 18.

Light passing through a front surface 18a of the cap member 18 is refracted into a frontward-directed parallel beam by Fresnel steps $18a_1$ formed on the rear of the front surface 18a. On the other hand, light passing through left and right side surfaces 18b of the cap member 18 is refracted into a parallel beam by the reflector 17 and is also directed frontward. These parallel beams are diffused in the vertical direction by laterally elongated cylindrical steps 32 formed on the rear surface of the front lens 20 and are directed frontward, as indicated by $L_{11}$.

The cap member 18 opens upward and sideward, except for the front surface 18a and left and right side surfaces 18b. The cap member 18 is provided integrally with a heat-shielding metal plate 18c at the opening portion thereof for suppressing problems due to heat such as deformation, which might otherwise occur in the top or bottom wall of the lamp body 12 because they are located close to the bulb 16.

The reflector 17 is formed in a lateral stair shape to reduce the dimension in the depth direction of the lamp. Specifically, a paraboloidal surface 17a of the reflector 17 is divided into vertically elongated webs having a predetermined width so that the divided paraboloidal surfaces which are closer to the bulb insertion hole 15 are positioned farther frontward. That is, without the stair-shaped reflector, the lamp body and reflector would have to be constructed as indicated by dotted lines 12a and 17a, respectively, as indicated in FIG. 4. However, owing to the stair-shaped reflector 17 according to the present invention, a front turn-signal lamp can be produced which is compact in size having a reduced dimension in the depth direction thereof.

Figure 1:
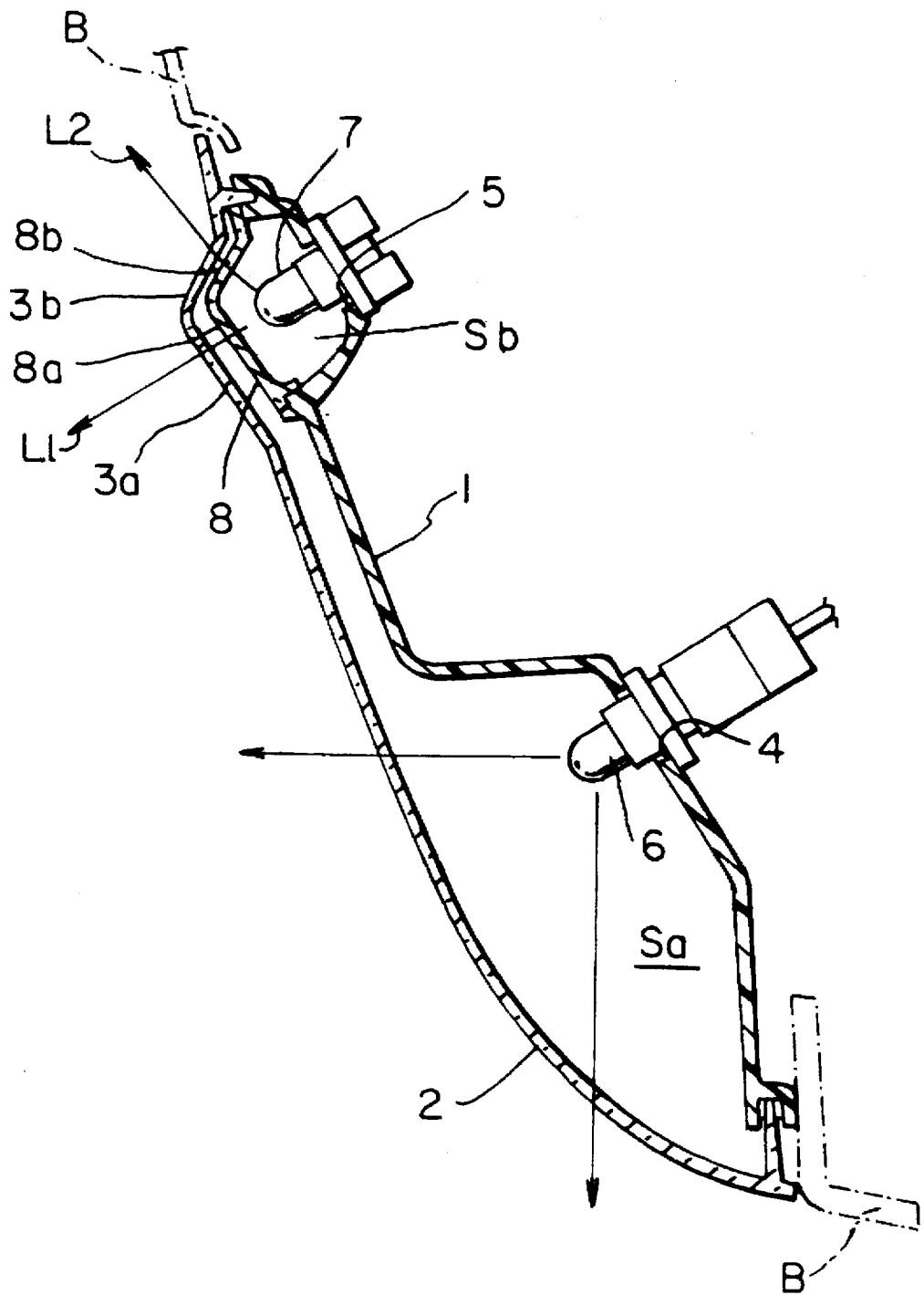
FIG. 1 is a horizontal sectional view of a conventional clearance lamp formed integrally with a turn-signal lamp.

On the other hand, the lamp body 13 of the side turn-signal lamp has a region at the outer part in the widthwise direction of the vehicle body which has a quadrangular pyramidal shape and expands frontward, and the frontward expanding part 20 is provided at a top, flat portion thereof with a bulb insertion hole 21 in which a bulb 22 is engaged, so that the illumination region sideward and rearward of the vehicle body is increased and, further, the dimension in the depth direction can also be reduced. That is, since the bulb 22 projects to a position ahead of the lamp body 13, light emitted from the bulb 22 can effectively illuminate the area along the side of the vehicle body, as indicated by $L_{23}$ in FIG. 4. Further, since the region of the lamp body 13 surrounding the bulb insertion hole 21 is recessed viewed from the rear of the lamp, contrary to the conventional lamp in which the region surrounding the bulb insertion hole is greatly expanded rearward as shown in FIG. 1, the rear end of the bulb protrudes only slightly from the rear wall of the lamp body. Accordingly, the lamp body 13 can be made further compact in size.

Moreover, the top part of the frontward expanded part 20 is located frontward of the periphery of the front opening of the lamp body 13, that is, the bulb insertion hole 21 is positioned forward of the seal groove 14b of the lamp chamber $S_2$ which engages a seal leg 30a of the front lens 30 and a front edge P of the shade 11 defining the lamp chamber $S_2$, i.e., the position of the periphery of the front opening of the lamp body 13 which is the frontmost position of the lamp body 13. Therefore, the bulb 22 engaged with the bulb insertion hole 21 protrudes only slightly in the rearward direction from the lamp body 13, and it does not protrude rearward of the rear wall of the lamp body 13. Thus, such a structure can effectively reduce the dimension of the side turn-signal lamp in the depth direction thereof.

A paraboloidal reflector 23 is formed on the inner surface of the lamp body 13 at the inner side thereof for reflecting light emitted from the bulb 22 frontward of the vehicle body. The reflected light is diffused vertically by laterally long cylindrical steps 32 formed on the rear surface of the front lens 30 and directed frontward, as indicated by an arrow $L_{21}$. Thus, the diffused light $L_{21}$ of the side turn-signal lamp illuminates the front area of the vehicle body in addition to the diffused light $L_{11}$ of the front turn-signal lamp, so that the visibility from the front of the vehicle body is improved. The reflector 23 of the side turn-signal lamp is also formed with a lateral stair shape to reduce the dimension in the depth direction of the lamp.

The front lens 30 is provided with an expansion illuminating member 31 at its outer edge in the widthwise direction of the vehicle body, that is, at the left side edge when viewed from the front. The expansion illuminating member 31, which is substantially rectangular in horizontal cross section, is constituted by a frontward-inclined illumination part 31a and a rearward-inclined illumination part 31b. An amber-colored inner lens 26 is disposed inside the expansion illuminating member 31 surrounding the bulb 22 and the frontward expanding part 20. The inner lens 26 is provided with a frontward-inclined lens surface 26a and a rearward-inclined lens surface 26b which are parallel to the frontward-inclined illumination part 31a and the rearward-inclined illumination part 31b, respectively, of the expansion illuminating member 31. Prism steps 27 are formed on the inner surface of the rearward-inclined lens surface 26b to refract the transmitted light beam inclinedly rearward.

The light emitted from the bulb 22 is colored amber upon passing through the inner lens 26. The beam transmitted through the lens surface 26b is diffused vertically by the steps 32 formed on the front lens 30 to illuminate the rearward-inclined region of the vehicle body along the side of the vehicle as indicated by an arrow $L_{23}$, whereas the beam transmitted through the lens surface 26a is diffused vertically by the steps 32 formed on the front lens 30 to illuminate the frontward-inclined region of the vehicle body as indicated by an arrow $L_{22}$.

The frontward expanding part 20 surrounding the bulb insertion hole 21 is formed to correspond to the shape of the expansion illuminating member 31 of the front lens 30 and that of the inner lens 26 formed inside the expansion illuminating member 31. Hence, since the depth dimension of the lamp chamber $S_2$ is substantially unchanged in the lateral direction thereof, the brightness inside the lamp chamber $S_2$ is substantially uniform when viewed from the front, thereby improving the external appearance of the lamp.

The embodiment described hereinbelow refers, as an example, to a turn-signal lamp which has side and front turn-signal lamps formed integrally with one another and which is mounted at a front corner of the vehicle body. However, the invention is not limited thereto or thereby. For example, a turn-signal lamp in which the side turn-signal lamp and the front turn-signal lamp are separately formed may also be employed. Further, the present invention is not limited to a turn-signal lamp as long as the lamp is mounted at a front or rear corner of the vehicle body and the lamp illuminates side regions of the vehicle. Furthermore, instead of a front turn-signal lamp, the invention may also be applied to a lamp which has an integrally formed turn-signal lamp and a clearance lamp, a tail-stop lamp, or the like.

As described above, according to the vehicular lamp of the present invention, since the light bulb is positioned forward of the periphery of the front opening of the lamp body, the region of illumination at the side of the lamp, that is, the illumination region at the side of the vehicle, is enlarged compared with the conventional lamp in which the bulb is positioned rearward of the region of the periphery of the front opening of the lamp body.

Further, since the region surrounding the bulb insertion hole protrudes frontward from the periphery of the front opening of the lamp body, the rear wall of the lamp body protrudes only slightly from the position in the rearward direction of the lamp body, and therefore the rear end of the light bulb engaged with the bulb insertion hole protrudes also only slightly in the rearward direction of the lamp body.

With the structure of the turn-signal lamp according to the second aspect of the invention, a part of the light emitted from the light bulb is reflected by the reflector to illuminate the region to the front of the lamp, while another part of the light illuminates the front region of the vehicle by passing through the frontward-inclined lens surface of the inner lens, and still another part of the light illuminates the rear region of the vehicle by passing through the rearward-inclined lens surface of the inner lens. The stair-shaped reflector formed on the inner surface of the lamp body allows the dimension in the front-rear direction of the lamp body to be reduced.

Owing to the third aspect of the invention, since the turn-signal lamp is formed integrally with the other lamp, a compact vehicular lamp can be provided.

On the other hand, in accordance with the fourth aspect of the present invention, light from the reflector of the side-turn-signal lamp is employed for illuminating the front area of the vehicle body in addition to light from the reflector of the front turn-signal lamp. The stair-shaped reflector of the front turn-signal lamp allows the dimension in the front-rear direction of the front turn-signal lamp to be reduced.

It should be understood that the form of the invention herein shown and described is to be taken as a preferred example of the invention and that various changes in the shape, size and arrangement of parts may be resorted to without departing from the spirit of the invention or the scope of the subjoined claims.

What is claimed is:

1. A vehicular lamp comprising:
    a lamp body for mounting at a corner portion of a vehicle body, said lamp body having a front opening which opens from a first periphery at a first location at one of the front and rear of the vehicle body toward a second periphery at a second location at a side of the vehicle body;
    a reflector formed on an the inner surface of said lamp body;
    a front lens covering at least said front opening of said lamp body;

a region of said lamp body at said second periphery location, surrounding a bulb insertion hole formed in said lamp body, protruding frontward of said front opening of said lamp body at said second periphery location; and a light bulb engaging said bulb insertion hole, said bulb being disposed frontward of said second periphery of said front opening of said lamp body at said second periphery location.

2. The vehicular lamp according to claim 1, wherein proximate said second periphery location said front lens is formed integrally with a frontward-inclined illumination part and a rear-inclined illumination part.

3. The vehicular lamp according to claim 2, further comprises an inner lens having a functional color provided inside said front lens.

4. The vehicular lamp according to claim 3, wherein said inner lens is integrally formed with a frontward-inclined lens surface and a rearward-inclined lens surface which extend substantially parallel to said frontward-inclined illumination part and said rearward-inclined illumination part, respectively, of said front lens.

5. The vehicular lamp according to claim 4, wherein said rearward-inclined lens surface of said inner lens comprises prism steps disposed on an inner surface thereof.

6. The vehicular lamp according to claim 3, wherein said inner lens is amber colored.

7. The vehicular lamp according to claim 1, wherein said reflector comprises at least a portion having a stair shape arranged laterally at an inner side of said lamp body.

8. The vehicular lamp according to claim 7, wherein the vehicular lamp is a turn-signal lamp comprising a first lamp and a second lamp, and said lamp body and said front lens of said first lamp being formed integrally with a second lamp body and a second front lens, respectively, for constituting said second lamp disposed adjacent said first lamp.

9. The vehicular lamp according to claim 8, wherein said first lamp is a side turn-signal lamp and said second lamp is a front turn-signal lamp.

10. The vehicular lamp according to claim 6, further comprising a second reflector formed on an inner surface of said second lamp body, said second reflector comprising at least a portion having a stair shape arranged laterally.

11. The vehicular lamp according to claim 8, further comprising a cap member mounted on a peripheral edge of a second bulb insertion hole formed in said second lamp body.

12. The vehicular lamp according to claim 11, wherein said cap member comprises Fresnel steps formed on a rear of a front surface of said cap member.

13. The vehicular lamp according to claim 1, wherein said bulb insertion hole is positioned frontward of a bottom edge of said front lens and of the periphery of said front opening of said lamp body.

14. The vehicular lamp according to claim 1, wherein said front lens comprises laterally extending long cylindrical steps formed on a rear surface thereof.

15. The vehicular lamp according to claim 1, wherein the lamp comprises a side turn-signal lamp and a front turn-signal lamp formed integrally with one another.

16. The vehicular lamp according to claim 1, wherein the lamp comprises a side turn-signal lamp and a front turn-signal lamp formed together.

17. The vehicular lamp according to claim 1, wherein the lamp comprises a turn-signal lamp and a clearance lamp.

18. The vehicular lamp according to claim 1, wherein the lamp comprises a turn-signal lamp and a tail stop lamp.

19. A vehicle lamp comprising:

a vessel-like first lamp body having a first front opening, a first reflector, a rear wall and a first lamp insertion hole;

a vessel-like second lamp body having a second front opening, a second reflector and a second lamp insertion hole; and a front lens covering said first and second front openings for defining with said first lamp body and said second lamp body, respectively, a first lamp chamber, said first reflector and said first lamp insertion hole being formed within said first lamp chamber, and a second lamp chamber, said second reflector and said second lamp insertion hole being formed within said second lamp chamber, said front lens curving from one of the front and rear of a vehicle body to a side thereof, a region of said first lamp body surrounding said first bulb insertion hole protruding frontward so that a rear end of a bulb in said first lamp insertion hole is positioned frontward of a rear wall of said first lamp body.

20. The vehicular lamp according to claim 19, wherein said first and second reflectors are divided into vertically elongated webs each having a predetermined width.

21. The vehicular lamp according to claim 19, further comprising an amber-colored inner lens disposed in front of said first bulb insertion hole, said inner lens being shaped to correspond to a shape of said protruding region surrounding said first insertion hole of said first lamp body.

22. The vehicular lamp according to claim 21, wherein said front lens comprises an expansion illuminating member at an outer edge in a widthwise direction of said vehicle body, said expansion illuminating member being substantially rectangular in horizontal cross section and comprising a frontward-inclined illumination part and a rearward-inclined illumination part, and said inner lens comprises a frontward-inclined lens surface and a rearward-inclined lens surface which are substantially parallel to said frontward-inclined illumination part and said rearward-inclined illumination part, respectively.

23. The vehicular lamp according to claim 22, wherein said rearward-inclined lens surface of said inner lens comprises prism steps formed on an inner surface thereof.

* * * * *